(12) United States Patent
Eickhorst

(10) Patent No.: US 8,706,302 B2
(45) Date of Patent: Apr. 22, 2014

(54) METHOD FOR OFFLINE PROGRAMMING OF AN NC-CONTROLLED MANIPULATOR

(75) Inventor: Dirk Eickhorst, Varel-Altjuhrden (DE)

(73) Assignee: Broetje Automation GmbH, Wiefelstede (DE)

( * ) Notice: Subject to any disclaimer, the term of this patent is extended or adjusted under 35 U.S.C. 154(b) by 260 days.

(21) Appl. No.: 13/190,715

(22) Filed: Jul. 26, 2011

(65) Prior Publication Data

US 2012/0029700 A1 Feb. 2, 2012

(30) Foreign Application Priority Data

Jul. 30, 2010 (DE) .......................... 10 2010 032 917

(51) Int. Cl.
*G06G 7/48* (2006.01)

(52) U.S. Cl.
USPC .............................................. 700/264; 901/2

(58) Field of Classification Search
USPC ............ 700/245–264; 901/2, 8, 9, 16, 23, 32; 318/568.1, 568.11–568.16
See application file for complete search history.

(56) References Cited

U.S. PATENT DOCUMENTS

| | | | |
|---|---|---|---|
| 8,010,235 B2 * | 8/2011 | Freeman | 700/265 |
| 8,401,698 B2 * | 3/2013 | Kamrani et al. | 700/245 |
| 2011/0153297 A1 * | 6/2011 | Keibel | 703/7 |

FOREIGN PATENT DOCUMENTS

EP 1 832 947 9/2007

* cited by examiner

*Primary Examiner* — Dalena Tran
(74) *Attorney, Agent, or Firm* — Michael J. Striker

(57) ABSTRACT

In a method for the offline programming of an NC-controlled manipulator which follows at least one real trajectory, possibly in a sensor-supported manner, with tool center point thereof in the real working mode, a kinematic manipulator model and, possibly, an environmental model are stored in an offline programming environment with user interface, at least one virtual trajectory of the manipulator and a virtual tolerance zone assigned to said trajectory are defined using the offline programming environment in a definition routine, and the offline programming environment is used to check, in a check routine, the previously defined tolerance zone at least in part in terms of kinematic singularities of the manipulator, the occurrence of which prompts a singularity routine to be executed.

27 Claims, 5 Drawing Sheets

METHOD FOR OFFLINE PROGRAMMING OF AN NC-CONTROLLED MANIPULATOR

CROSS-REFERENCE TO RELATED APPLICATION

The invention described and claimed hereinbelow is also described in German Patent Application DE 10 2010 032 917.7 filed on Jul. 30, 2010. This German Patent Application, whose subject matter is incorporated here by reference, provides the basis for a claim of priority of invention under 35 U.S.C. 119(a)-(d).

BACKGROUND OF THE INVENTION

The present invention relates to a method for the offline programming of an NC-controlled manipulator, an offline programming system, and a manipulator system.

NC-controlled manipulators are often used today as six-axis jointed-arm robots in automated production. Due to complex operating sequences, high demands are placed on users in regard to the programming of such manipulators.

To minimize the amount of time spent online for programming, the trend in many areas has been to shift as much programming as possible offline. In that case, the relevant NC program is created in such a manner that it is decoupled from the production line in terms of time and possibly in terms of space.

A known offline programming system for an NC-controlled manipulator provides a simulation in which trajectories can be simulated and programmed (EP 1 832 947 A2). Said offline programming system can also be used to simulate and program sensor-supported trajectories. A sensor assigned to the manipulator is modeled and simulated for this purpose. An NC program is then regularly created in a postprocessor, thereby transforming the simulated, virtual trajectories into real trajectories.

A problematic aspect of offline programming is that the real circumstances and the virtual circumstances are never fully identical. This relates to the occurrence of geometric deviations on the manipulator and on environmental components such as workpieces or the like. This also relates to control-related measures for axial compensation for offsetting changes in the manipulator kinematics caused by the environment.

The deviations mentioned initially can be corrected by the use of sensors. Said correction is always associated with a certain displacement of the tool center point (TCP) of the manipulator. The latter deviations are manifested as offsets in the axis values, however.

Both of the aforementioned deviations can cause the manipulator to enter into singularities in the working mode. In that case, the production line typically comes to a standstill and the trajectories must be re-taught. The costs incurred due to loss of production and restart thereof are usually considerable.

SUMMARY OF THE INVENTION

The problem addressed by the invention is that of providing a method for the offline programming of an NC-controlled manipulator, in which the risk of singularities occurring in the real working mode is reduced.

The proposed method for the offline programming of an NC-controlled manipulator, which follows a real trajectory in the working mode with the tool center point (TCP) thereof, accesses an offline programming environment comprising a user interface. A kinematic manipulator model and, possibly, an environmental model are stored in the offline programming environment.

It is essential that at least one virtual trajectory of the manipulator, and a virtual tolerance zone assigned to said trajectory, are defined using the offline programming environment in a definition routine. The tolerance zone depicts path deviations from the virtual trajectory.

The tolerance zone can be defined as a volume, a quantity of path sections, a point cloud, or the like. In any case, it is essential that the tolerance zone comprise the geometric path deviations that occur during actual operation. Accordingly, the tolerance zone usually encloses the assigned trajectory or at least adjoins the assigned trajectory.

It is also essential that the previously defined tolerance zone be checked, at least in part with regard to kinematic singularities of the manipulator, using the offline programming environment in a check routine. If a singularity occurs, a singularity routine is subsequently executed.

The expression "occurrence of a singularity" is broadly defined in this context. It describes the direct positioning at a singular point and the undershooting of a predetermined distance to a singular point.

The term "singularity" is likewise broadly defined. It refers to "singularities" in the classical sense as based on a certain axial configuration in which two axes are colinear. In this case, however, the term "singularity" also refers to simple ambiguity in the axial configuration, the non-attainability of a via point, and the collision of the manipulator with itself. The term "singularity" can also refer to a discontinuity in the trajectory. Most generally, the term "singularity" refers to a state that cannot be implemented by the NC control without further measures, and is therefore regularly associated with a stoppage of the NC control.

Using the proposed method it is possible to depict all of the aforementioned path deviations using tolerance zones. Given that a complete singularity check can be performed for the trajectories as well as the tolerance zones in the offline mode, the occurrence of singularities in the eventual real working mode can be largely ruled out.

In a preferred variant that is particularly easy to embody, a warning message is simply output to the user by the user interface in the singularity routine. The user can then modify the programmed trajectory such that singularities stop occurring in the assigned tolerance zone. The elimination of all singularities is thus an interactive process (claim 2).

Once all singularities have been eliminated, the virtual trajectories are preferably implemented in instructions of an NC program (claim 3).

It is basically feasible for the virtual tolerance zones to not be incorporated into the NC program, and to be utilized only in the offline check for singularities. However, it is preferable for a virtual tolerance zone to be incorporated in the creation of the NC program such that the control blocks an overshooting of the geometric limits of the corresponding real tolerance zone in the working mode. In this case, the user can reduce the size of the particular tolerance zone in the offline programming mode to prevent singularities from occurring.

In principle, the definition routine can also be automated further. To accomplish this, however, the programming environment must provide information regarding the operating sequence which results inter alia by following trajectories and/or executing sensor functions and/or executing technology functions (claim 5).

In the preferred embodiment according to claim 6, according to an alternative, the virtual trajectory is generated automatically on the basis of the stored working sequence.

In the preferred embodiment according to claim 11, the at least one tolerance zone is determined, at least in part, from the hypothetical path deviations, which can result from the axial compensation at every path point, at the maximum, given original manipulator kinematics. In this context, "original manipulator kinematics" refers to the state of the manipulator kinematics that has not undergone any changes due to temperature, load, or the like. One could also say that the axial compensation is applied to the original manipulator kinematics, and thus the axial offsets are transformed into corresponding path deviations.

It is thereby ensured that singularities that are due exclusively to a very specific axial configuration, and that are caused by the control-related axial compensation in the real working mode are depicted in the tolerance zone and can be determined within the scope of the check routine. In a particularly preferred embodiment, the corresponding path deviations are added to the above-mentioned path deviations caused by geometric positional deviations.

According to a further teaching according to claim 17, which has independent significance, an offline programming system for an NC-controlled manipulator is claimed, wherein a computer system provides an offline programming environment for implementing the proposed method described above. Reference is made to all embodiments that relate to the proposed method.

According to a further teaching according to claim 18, which also has independent significance, a manipulator system comprising an NC-controlled manipulator with NC control and an offline programming system described above is claimed. Reference is made to all embodiments of the proposed offline programming system and the proposed method.

The invention is explained below in greater detail with reference to a drawing that depicts only one embodiment. In the drawing.

DESCRIPTION OF THE PREFERRED EMBODIMENTS

Figure 1:
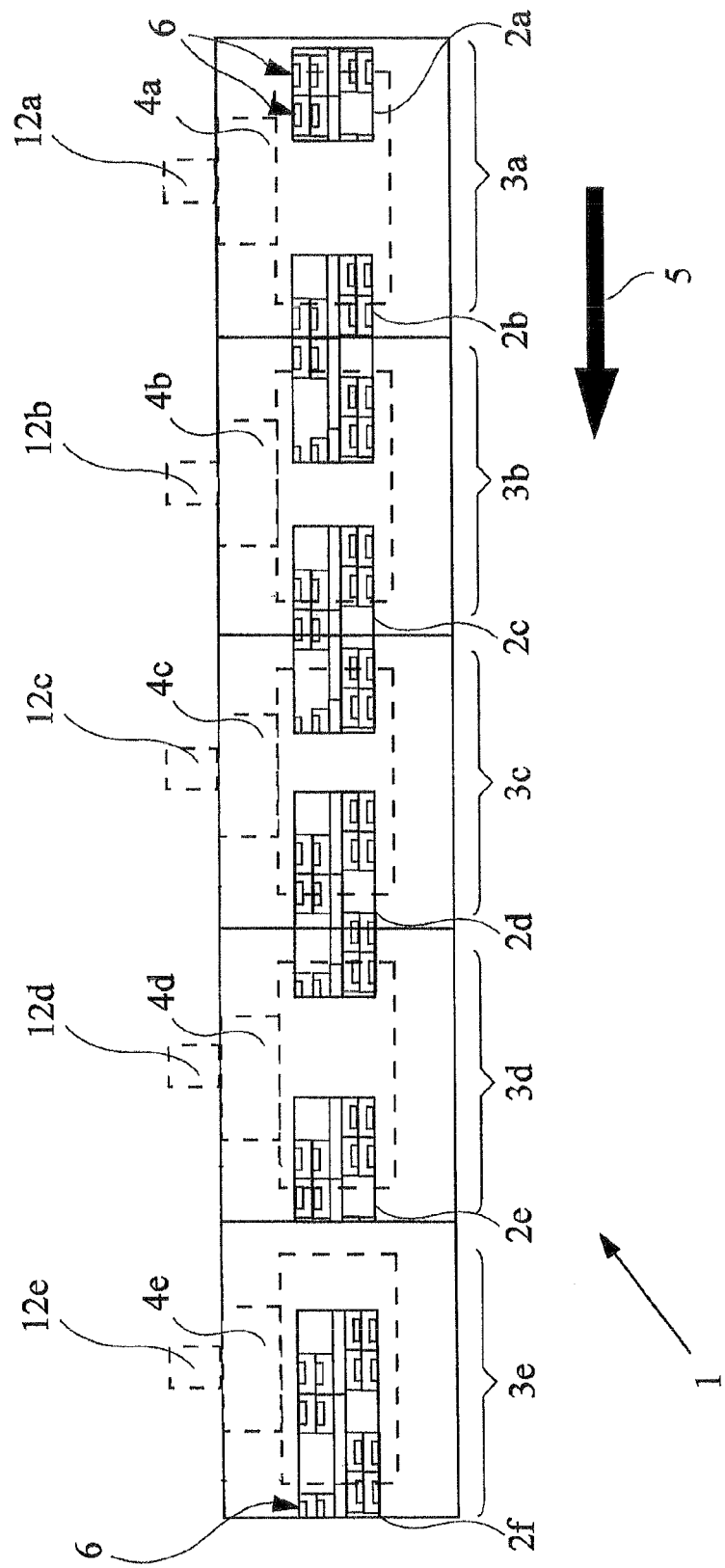
FIG. 1 shows a paced production line comprising manipulators, on which the proposed offline programming method is used.

Production line 1 shown in FIG. 1 is used to process airplane structural components 2a-2f. It is equipped with a total of five workstations 3a-3e, each of which comprises a processing machine 4a-4e which is an NC-controlled manipulator 4a-4e in this case. Of course, a workstation 3 can also be equipped with two or more processing machines 4.

In the preferred embodiment shown, airplane structural components 2a-2f are airplane fuselage sections 2a-2f which are conveyed along the longitudinal axis thereof through workstations 3a-3e. The longitudinal axes extend parallel to conveyance direction which is indicated by an arrow 5 in FIG. 1.

Airplane structural components 2a-2f are each equipped with a row of parallel frames 6 which are merely indicated in FIG. 1, and each of which extends substantially perpendicularly to conveyance direction 5.

Figure 2:
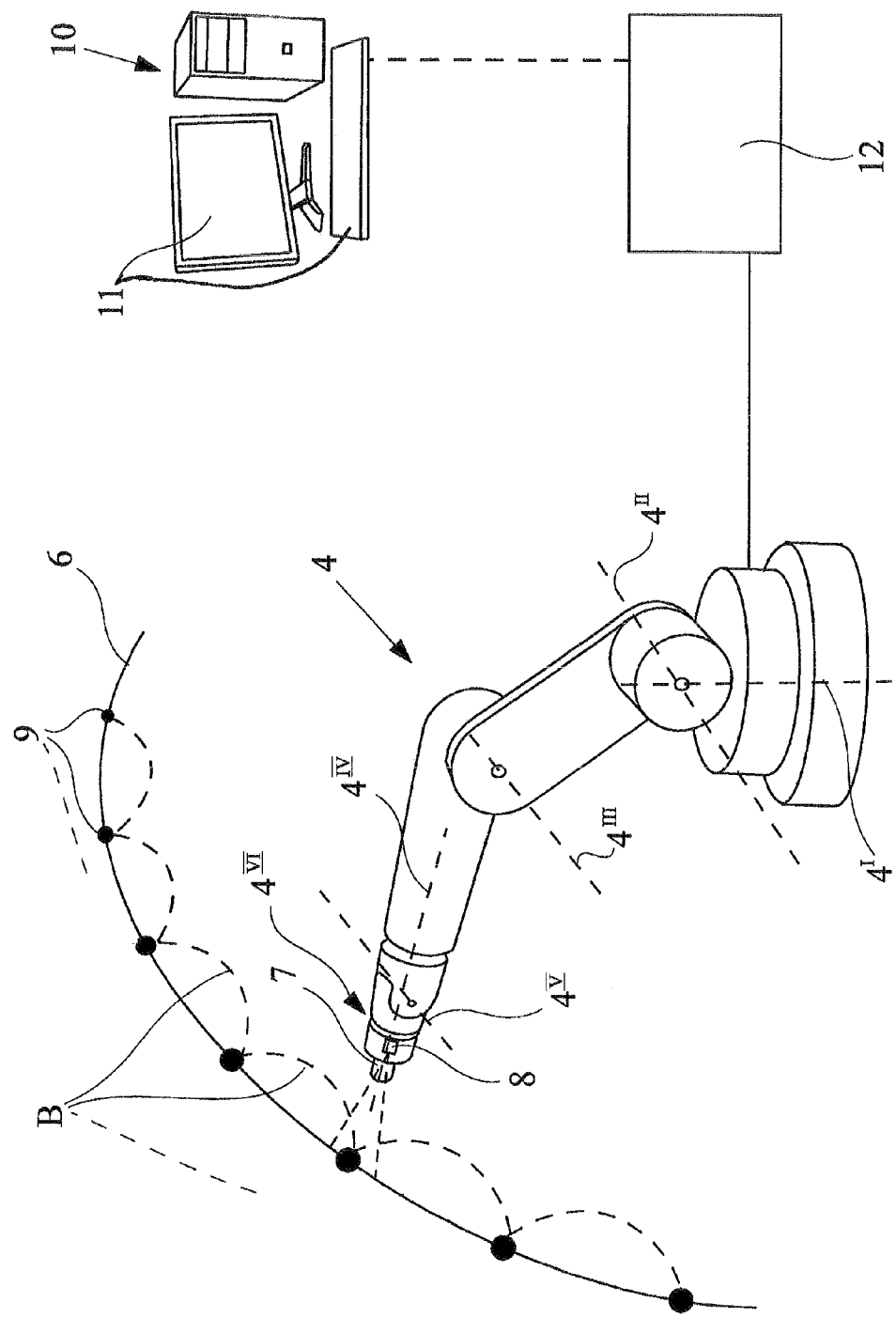
FIG. 2 shows one of the manipulators according to FIG. 1 in the real working mode, in an entirely schematic view.

FIG. 2 shows, as an example, one manipulator 4 of manipulators 4a-4e depicted in FIG. 1. In the embodiment shown, riveting operations will be performed on frames 6. For this purpose, manipulator 4 is equipped with a riveting tool 7 which is depicted schematically in FIG. 2.

The airplane production discussed above will be used to explain the proposed method for offline programming. This is not intended to be limiting, however. Instead, the proposed method can be used anywhere that manipulator 4 follows at least one real trajectory B, possibly in a sensor-supported manner, using tool center point (TCP) thereof in the real working mode.

To realize sensor-supported trajectories B, manipulator 4 is equipped—in this case and preferably—with a sensor 8, such as a CCD camera, a laser tracker, a laser distance sensor, or the like.

Sensor 8 is typically used to compensate for geometric component tolerances and positional tolerances. In a sensor-supported trajectory B, at least a portion of the path points are dependent on the particular sensor measured values. In the working mode, manipulator 4 follows a sensor-supported trajectory B depending on the sensor measured values, i.e. different alternative trajectories. Path deviations from the originally programmed trajectory occur in the real working mode.

One example of a sensor-supported trajectory B is shown in FIG. 2. In this case, the objective is to approach bore holes 9 in order to perform riveting operations there. When a bore hole 9 is approached, sensor 8 is regularly activated. If a CCD camera is used, the sensor measured values take the form of those shown in FIG. 4. In the situation shown, the TCP is not yet centered on bore hole 9, due to geometric positional deviations. The result in this case is a first sensor measured value which is a necessary path deviation in the x direction ($\Delta x$), and a second measured value which is a necessary path deviation in the y direction ($\Delta y$) in order to center the TCP on bore hole 9. These details about direction are provided merely as examples, of course.

Figure 3:
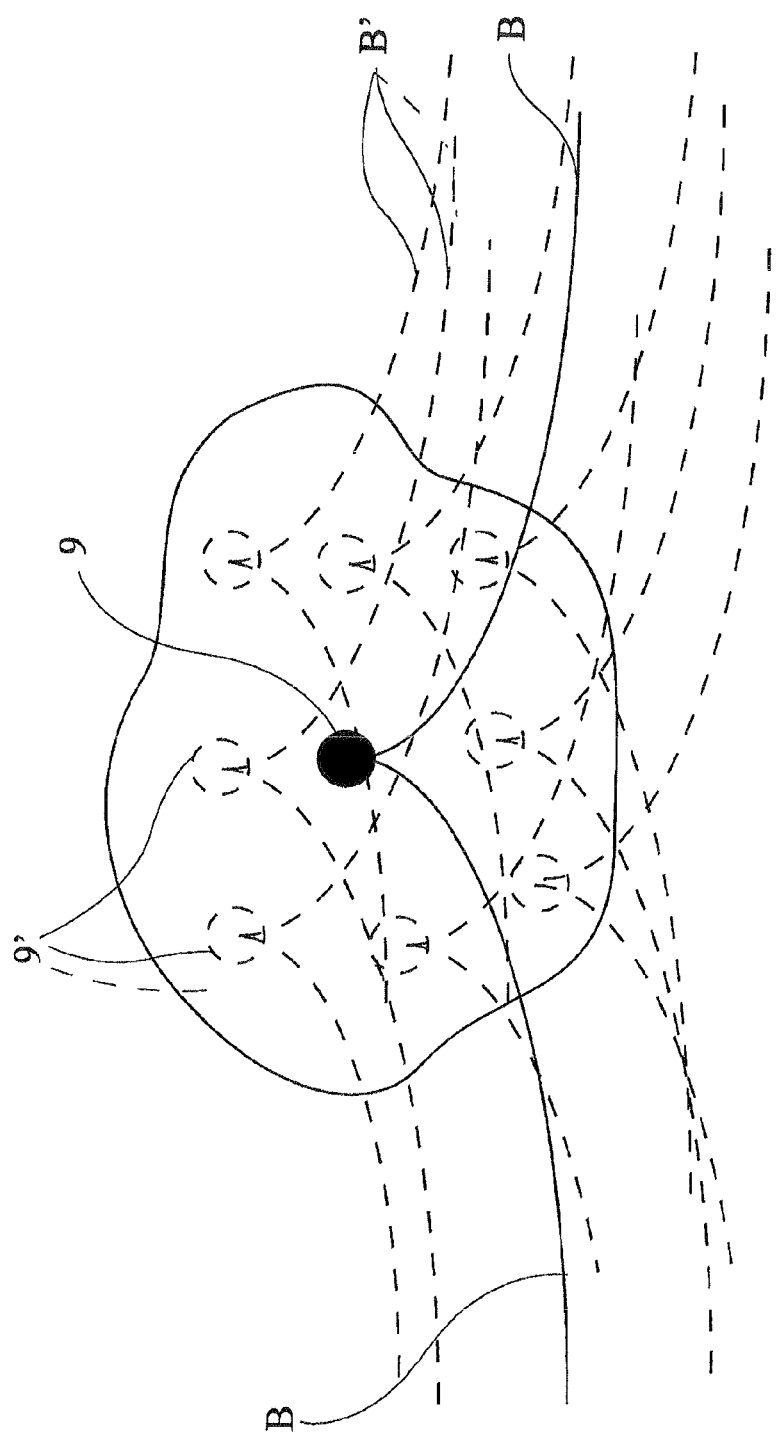
FIG. 3 shows a point to be approached, with a real trajectory for the manipulator according to FIG. 2.
Figure 4:
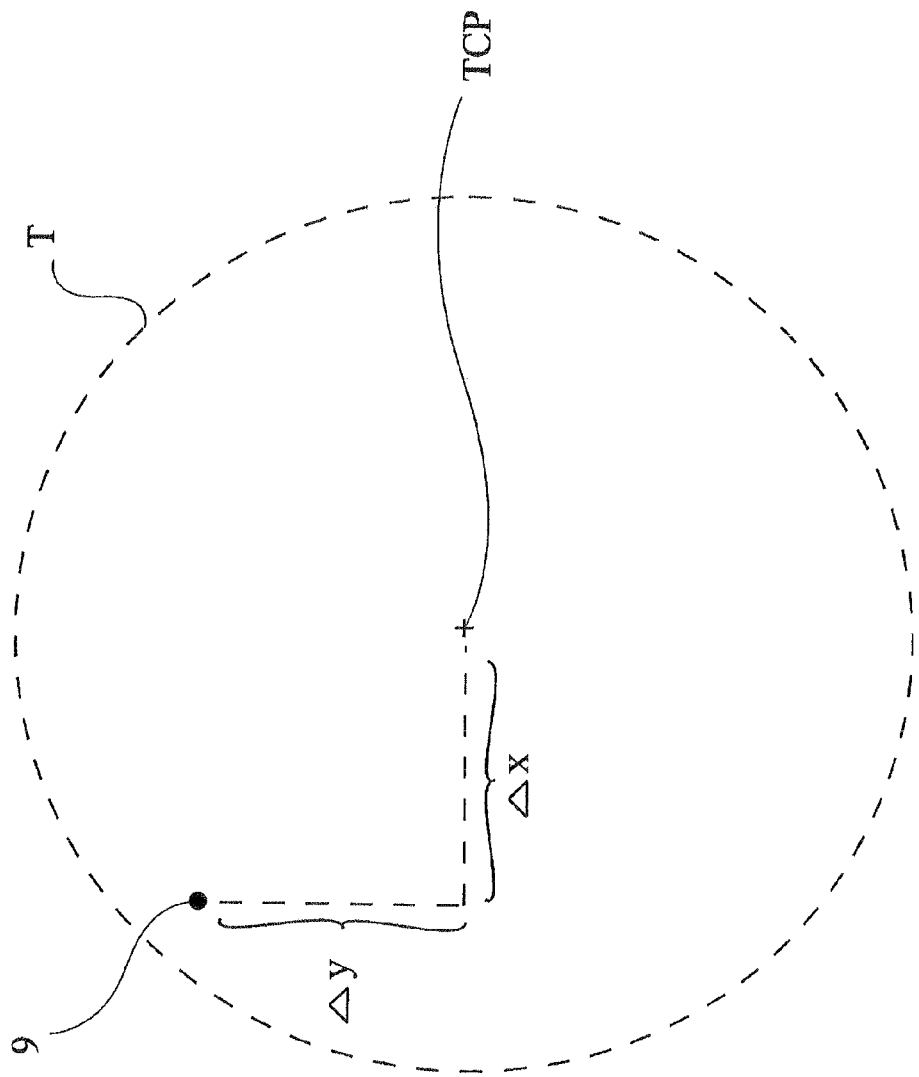
FIG. 4 shows a mode of operation, as an example, of an optical sensor as the manipulator approaches the point shown in a schematic diagram in FIG. 3.

When FIGS. 2, 3, and 4 are viewed in entirety, path deviations from trajectory B therefore result due to the positional deviation of bore holes 9. The particular adjacent trajectories must be adapted to said path deviations in order to ensure that a trajectory is continuous. This is indicated clearly in the illustration shown in FIG. 3, which shows a bore hole 9 to be approached with associated trajectory B, as a solid line, and various alternative positions 9' with associated alternative trajectories B', as dashed lines.

If trajectory B is nevertheless located in the direct vicinity of a singularity of manipulator 4, the above-described path deviations illustrate the risk of actually arriving at said singularity. This is where the present invention comes in.

The proposed method utilizes an offline programming environment 10 comprising a user interface 11, which is depicted schematically in FIG. 2. A kinematic manipulator model and, preferably, an environmental model are stored in offline programming environment 10, which is preferably PC-based. The kinematic manipulator model comprises all data that are required to depict the kinematics of manipulator 4. This includes inter alia the position of manipulator axes $4^I$-$4^{VI}$, the swivel ranges of manipulator axes $4^I$-$4^{VI}$, and further structural details of the kinematic design of manipulator 4.

The environmental model comprises the geometric data on the components with which manipulator 4 is intended to interact. These include, for instance, the geometric data on structural components 2 which are above-mentioned frames 6 in this case.

Offline programming environment 10 usually also provides a graphic simulation of the modelled components and the motions thereof. Using offline programming environment 10, it is possible to define at least one virtual trajectory b of manipulator 4 in a definition routine. In this regard, the design of offline programming environment 10 is still commonplace.

At this point it is essential that a virtual tolerance zone t, which is assigned to particular virtual trajectory b and depicts path deviations from virtual trajectory b, be definable.

Said tolerance zones t, which are determined offline, can be based on any path deviations to be expected in the real working mode. They include, in particular, the above-described path deviations in the sensor-supported compensation of component tolerances and positional tolerances. A real tolerance zone T corresponds to each virtual tolerance zone t; the significance thereof will be explained below. A real tolerance zone T is merely indicated in FIG. 4.

Figure 5:
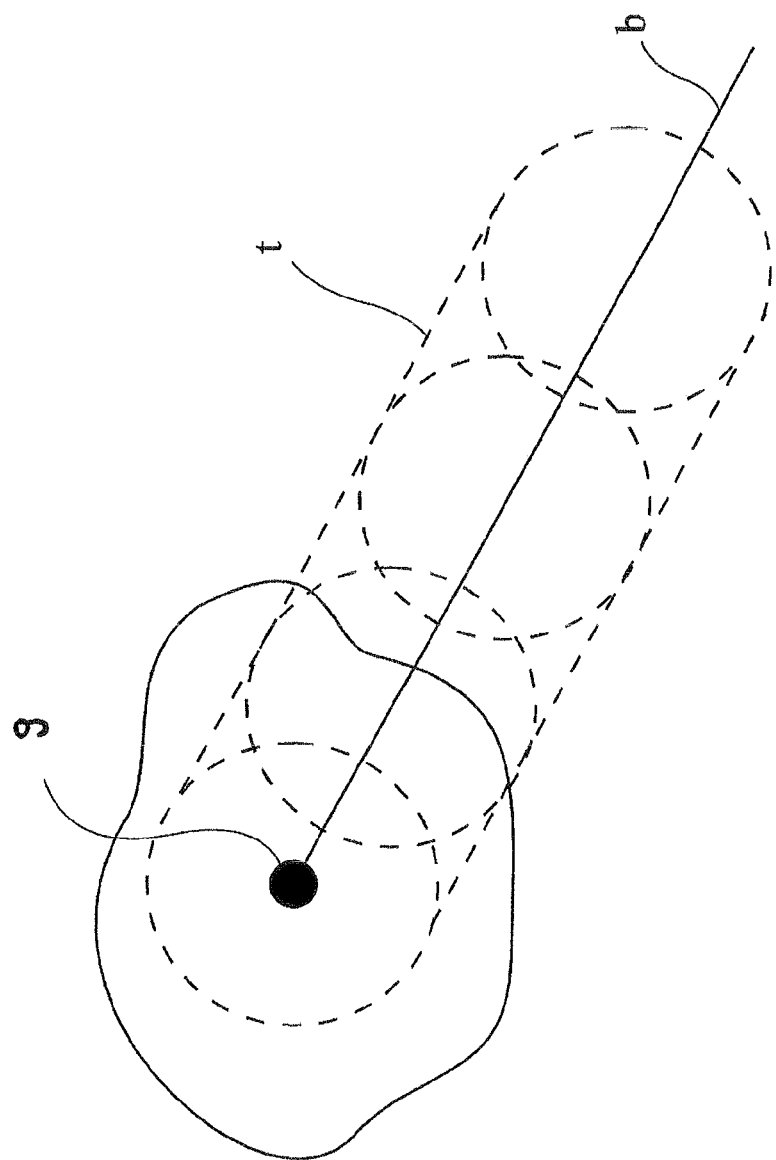
FIG. 5 shows a section of a virtual trajectory, as an example, in the offline programming environment with assigned tolerance zone.

A tolerance zone t can be defined largely arbitrarily, in a manner to be explained below. One possibility is to define tolerance zone t as a volume. FIG. 5 shows, as an example, a tubular tolerance zone t which is assigned to a trajectory b.

Another way to define a tolerance zone t is to define tolerance zone t as a quantity of path sections or as a point cloud. In the extreme case, a tolerance zone t comprises only a single path section or a single point.

The fact that the at least one tolerance zone t is subjected to a singularity check is interesting in this case. Specifically, offline programming environment 10 is used to check, in a check routine, the at least one previously defined tolerance zone t at least in part in terms of kinematic singularities of manipulator 4; if a singularity occurs, an appropriate singularity routine is executed. The broad interpretation of the expression "occurrence of a singularity" was addressed above.

The check routine can be carried out in entirely different variants. In one particularly simple variant, every path point assigned to tolerance zone t is checked individually in terms of a singularity of manipulator 4. However, it is also feasible to check entire alternative paths contained in a tolerance zone t in an interrelated manner, thereby enabling detection of discontinuities in the alternative paths, which may be understood to be a singularity in the sense described above.

In the simplest case, which is preferable in this context, programming environment 10 outputs a warning message to the user via user interface 11 when a singularity is identified using the singularity routine.

In response to the warning message, the user can modify virtual trajectory b and/or virtual tolerance zone t assigned to said trajectory b in such a way that the singularity stops occurring.

If the singularity is based on ambiguities in the axial configuration, another possible response to the warning message is for virtual trajectory b to be defined using axial coordinates, so that the axial configuration is unambiguous from the beginning. Accordingly, programming environment 10 is preferably designed such that trajectories b can be defined using Cartesian coordinates and axial coordinates. It is also feasible for programming environment 10 to permit the assignment of a certain axial configuration.

In the proposed method, the definition routine and the check routine are preferably executed until singularities as described above stop occurring.

Next, in a postprocess routine, virtual and possibly sensor-supported trajectory b is implemented in instructions of an NC program for manipulator 4.

Finally, the NC program is loaded into NC control 12 of manipulator 4, thereby enabling the at least one virtual and possibly sensor-supported trajectory b in the programming mode to be transformed into a real and possibly sensor-supported trajectory B in the real working mode. In the postprocess routine, particular emphasis is placed on whether virtual trajectory b is defined using Cartesian coordinates or axial coordinates.

Preferably, virtual tolerance zone t is also considered in the generation of the NC program. In that case, it is ensured that the control blocks an overshooting of the geometric limits of the corresponding real tolerance zone T in the working mode. This is preferably associated with a stoppage of manipulator 4. The term "blocks" has broad meaning in the present case, and is not limited to a blocking of the motion of manipulator 4. It can also refer to a smoothing of the path points such that the geometric limits of the corresponding real tolerance zone T are no longer exceeded in the working mode.

In addition to at least one trajectory b, at least one operating sequence is preferably stored in programming environment 10 as well; said operating sequence results inter alia from a series of the tracing of trajectories b and/or executing sensor functions and/or executing technology functions. A technology function involves performing a riveting operation, for instance. The operating sequence is usually part of a higher-order operating sequence.

In principle, it is also feasible for the definition routine to be executed substantially manually. In that case, the at least one virtual trajectory b is preferably input or modified, in particular being virtually taught, in the definition routine via user interface 11. It is also feasible for the at least one virtual trajectory b to be generated in the definition routine largely automatically, preferably on the basis of the stored operating sequence. Automatic trajectory planning of this type is generated from the operating sequence that comprises a series of riveting operations, for instance. The automatic trajectory planning provides particularly convenient variants for the user.

In an alternative that is particularly easy to implement, tolerance zone t can be entered or modified manually in the definition routine via user interface 11. An automatic or semi-automatic definition is also feasible in this case.

Various variants of the manual definition of tolerance zone t using programming environment 10 are feasible. When defined as volume, tolerance zone t can be defined preferably in various geometries. For this purpose, it is advantageous for tolerance zone t to be defined to be substantially tubular, enclosing assigned virtual trajectory b (FIG. 5). It is also feasible, however, for tolerance zone t to be rectangular or the like. To this end, programming environment 10 preferably provides a type of construction kit of geometries which can be used to construct tolerance zone t.

When tolerance zone t is defined by a quantity of path sections, however, it is feasible for the user to select, in the graphical simulation, a section of a previously defined trajectory b by making the appropriate entries, specifying a desired path deviation, and assigning same to particular tolerance zone t. This can be repeated as often as necessary depending on the quantity of path sections desired.

Finally, when tolerance zone t is defined by a point cloud, it is feasible for the user to select individual points in the graphical simulation and assign same to particular tolerance zone t.

Independently of the definition of particular tolerance zone t, it is advantageously possible for tolerance zone t to be determined automatically or at least semi-automatically. To this end, the manipulator model preferably comprises a sensor model in which the sensor measurement range is depicted. Furthermore, the sensor model also includes the correlation between sensor measured values and the resulting movements of manipulator 4. Proceeding therefrom it is possible to automatically determine the basic structure of resulting tolerance zone t at the least. Preferably, tolerance zone t is then determined at least in part on the basis of the operating sequence and/or the sensor model and/or on the basis of further user input, if applicable. The user input relates to a size limitation of tolerance zone t, for instance.

Current NC controls 12 for manipulators 4 are regularly equipped with automatic axial compensation. The axial compensation defines an axial offset for at least one manipulator axis $4^I$-$4^{VI}$, to account for changes in the manipulator kinematics. Such changes in the manipulator kinematics are based on predefined environmental conditions such as temperature, load, or the like.

The above-described axial compensation results in a change in the axial configuration if the absolute position of the TCP id unchanged. Basically, this can cause the axial configuration to become singular by way of the axial compensation. To check the approach of a singular axial configuration offline, the at least one tolerance zone t is determined in the definition routine, at least in part, from the hypothetical path deviations, which can result from the axial compensation at every path point, at the maximum, given original manipulator kinematics. The path deviation that defines tolerance zone t thereby results simply by applying the particular, theoretical axial offset from the axial compensation given original manipulator kinematics to individual manipulator axes $4^I$-$4^{VI}$.

It is appropriate that the deviations determined from the axial compensation are added to the deviations based on the geometric positional deviations in order to determine tolerance zone t. The reason therefor is that said deviations are likewise superimposed to a certain extent in the real working mode.

Particularly realistic offline programming results from a control perspective when the NC core of real NC control 12 is depicted in programming environment 10. In a particularly preferred embodiment, the "virtual" NC core is even a software-based copy of the "real" NC core. In any case, a transformation routine is preferably provided, which can be used to perform a back-transformation from position and orientation data to manipulator axial data, wherein the transformation routine in programming environment 10 is preferably identical to the corresponding transformation routine of NC control 12.

The transformation routine plays a substantial role in the execution of the check routine. In one variant, the transformation routine is used to check preferably every path point assigned to tolerance zone t to determine whether the point can be reached by the manipulator kinematics.

Alternatively or in addition thereto, the transformation routine can be used in the check routine to check preferably every path point assigned to tolerance zone t to determine whether the point results in ambiguities in the axial data of manipulator 4.

Alternatively or in addition thereto, a collision routine can be provided, which can be used to perform a collision check in terms of a collision of manipulator 4 with the components depicted in the environmental model, wherein the collision routine is used in the check routine to check preferably each path point assigned to tolerance zone t to determine whether an approach to the point can result in manipulator 4 colliding with the components stored in the environmental model.

In summary, the capability to define a virtual tolerance zone t in programming environment 10 makes it possible to check all of the expected path deviations from a programmed trajectory offline in terms of singularities of any type. It is therefore possible to largely rule out production interruptions caused by the occurrence of singularities.

According to a further teaching, which has independent significance, an offline programming system for an NC-controlled manipulator 4 is claimed, wherein a computer system provides an offline programming environment 10 for implementing the proposed method described above. Reference is therefore made to all embodiments of the proposed method.

According to a further teaching, which also has independent significance, a manipulator system comprising an NC-controlled manipulator 4 with NC control 12 and an offline programming system described above is claimed. Reference is likewise made to all embodiments of the offline programming system and the proposed method.

In a particularly preferred embodiment, manipulator 4 is a robot having serial kinematics, preferably a 6-axis jointed-arm robot, in particular, as depicted in FIG. 2. Other variants of manipulator 4 are feasible.

Finally, it was already pointed out that, in this case, and preferably, manipulator 4 guides a tool 7, i.e. a riveting tool 7 in particular. Numerous other variants are also feasible in this regard.

It will be understood that each of the elements described above, or two or more together, may also find a useful application in other types of methods and constructions differing from the types described above.

While the invention has been illustrated and described as embodied in an method for offline programming of an NC-controlled manipulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for offline programming a numerical controller-controlled (NC-controlled) manipulator which follows at least one real trajectory, possibly in a sensor-supported manner, with tool center point thereof in a real working mode, using an offline programming environment comprising an offline programming system and a user interface, the method comprising the steps of:
    storing a kinematic manipulator model and, possibly an environmental model in the offline programming environment;
    using the offline programming environment in a definition routine to define at least one virtual trajectory of the NC-controlled manipulator and a virtual tolerance zone assigned to said trajectory; and
    using the offline programming environment to implement a check routine to check the virtual tolerance zone, which is previously defined at least in part in terms of kinematic singularities of the NC-controlled manipulator, and if an occurrence of a singularity is determined prompting a singularity routine to be executed.

2. The method as defined in claim 1, further comprising outputting by the programming environment in the singularity routine a warning message to a user via the user interface.

3. The method as defined in claim 1, further comprising implementing, in a postprocess routine, the virtual and possibly sensor-supported trajectory in instructions of an NC program for the manipulator which is loaded into an NC control of the manipulator, and so the at least one virtual and possibly sensor-supported trajectory in a programming mode is transformed into a real and possibly sensor-supported trajectory in a working mode.

4. The method as defined in claim 3, further comprising incorporating the virtual tolerance zone into a creation of the NC program such that a control blocks an overshooting of limits of a corresponding real tolerance zone in the working mode.

5. The method as defined in claim 4, further comprising also causing by the control the manipulator to stop.

6. The method as defined in claim 1, further comprising storing at least one operating sequence, which results inter alia from a series of parameters selected from the group consisting of tracing of trajectories, executing sensor functions, executing technology functions, and combinations thereof in the programming environment.

7. The method as defined in claim 1, further comprising inputting or modifying the at least one virtual trajectory in the definition routine via the user interface.

8. The method as defined in claim 7, further comprising virtually teaching the at least one virtual trajectory in the definition routine via the user interface.

9. The method as defined in claim 1, further comprising generating the at least one virtual trajectory in the definition routine automatically.

10. The method as defined in claim 9, further comprising the generating the at least one virtual trajectory in the definition routine automatically on a basis of a stored operating sequence.

11. The method as defined in claim 1, further comprising entering or modifying the tolerance zone in the definition routine manually via the user interface.

12. The method as defined in claim 1, further causing defining the tolerance zone in various geometries via the programming environment.

13. The method as defined in claim 12, wherein said defining includes defining the tolerance zone to be substantially tubular, enclosing the virtual trajectory line.

14. The method as defined in claim 1, further comprising using in the manipulator model a sensor model in which a sensor measuring range is depicted.

15. The method as defined in claim 14, wherein said using includes using the sensor model in which a correlation between sensor measured values and resulting measurements of the manipulator are depicted.

16. The method as defined in claim 1, further comprising determining in the definition routine the at least one tolerance zone at least in part from an element selected from the group consisting of an operating sequence, a sensor model, a further user input, and combinations thereof.

17. The method as defined in claim 1, further comprising providing by the NC control of the manipulator automatic axial compensation that defines an axial offset for an at least one manipulator axis to account for geometric changes in manipulator kinematics which are due to predefined environmental conditions selected from the group consisting of a temperature, a load, and another condition, and determining the at least one tolerance zone in the definition routine at least in part on a basis of hypothetical path deviations which can result from an axial compensation at every path point, at maximum, given assumed original manipulator kinematics.

18. The method as defined in claim 17, further comprising adding the path deviations determined from the axial compensation to path deviations based on a sensor support in order to determine the tolerance zone.

19. The method as defined in claim 1, further comprising providing a transformation routine used to perform a back-transformation from position and orientation data into manipulator axial data.

20. The method as defined in claim 19, further comprising forming the transformation routine identical to a corresponding transformation routine of the NC control.

21. The method as defined in claim 19, further comprising using the transformation routine in a check routine.

22. The method as defined in claim 21, wherein said using the transformation routine in the check routine includes checking preferable every point of the tolerance zone to determine whether the point is reachable by manipulator kinematics.

23. The method as defined in claim 21, wherein said using the transformation routine in the check routine includes checking every point of the tolerance zone to determine whether the point results in ambiguities in axial data of the manipulator.

24. The method as defined in claim 1, further comprising providing a collision routine used to perform a collision check in terms of a collision of the manipulator with components depicted in the environmental model, and using the collection routine in a check routine.

25. The method as defined in claim 24, wherein said using the collision routine in the check routine includes checking each path point of the tolerance zone to determine whether an approach to the point can result in the manipulator colliding with components stored in the environmental model.

26. An offline programming system for an NC-control manipulator, wherein the offline programming system provides an offline programming environment for implementing the method defined in claim 1.

27. A manipulator system, comprising an NC-control manipulator with an NC control and the offline programming system defined in claim 26.

* * * * *